UNITED STATES PATENT OFFICE.

DAVID DEAR, OF SALINA, NEW YORK.

IMPROVEMENT IN THE PROCESS OF SEPARATING AND REMOVING THE BITTERINGS FROM THE KETTLES OR BOILERS USED IN THE MANUFACTURE OF SALT.

Specification forming part of Letters Patent No. 428, dated October 18, 1837.

*To all whom it may concern:*

Be it known that I, DAVID DEAR, of the town of Salina, county of Onondaga, and State of New York, have invented a new and Improved Mode of Separating the Bitterings from and Cleaning the Same from Salt Kettles or Boilers of any description used in the Manufacture of Salt; and I do hereby declare that the following is a full and exact description thereof.

The nature of my invention consists in using any of the properties of ashes—such as lye, kelp, or potash—in such quantity as shall be necessary to slack, soften, or remove the bitterings from the kettles or boilers of any description used in the manufacture of salt, without cooling down the fire underneath the kettles or boilers of any description in which salt is or may be manufactured.

To enable others to make use of and use my invention, I will proceed to describe the manner in which I clean the kettles or boilers of the bitterings collected on the inside of them by boiling salt therein.

In the first place, as the kettles or boilers to the salt-blocks are in full operation in making salt, I commence with any two or more of the kettles or boilers in the block and dip the brine out of them. I then fill the kettles or boilers so emptied with lye or with fresh water and dissolve kelp or potash therein, or such other alkali as shall have the same effect, in sufficient quantity to make a strong lye thereof, which lye, when heated to a boiling state, has such an effect upon the bitterings adhering to the kettles or boilers as to either slack or soften them to such a degree that they may be removed with and taken out of the kettle or boiler with a ladle made for the purpose. After removing the bitterings from the kettle or boiler proceed to dip and clean the lye from the same and pour it into the next empty kettle or boiler, and then fill up the first kettle or boiler, so cleaned of its bitterings and lye, with brine from the third kettle or boiler. Proceed in the same manner until the kettles or boilers in the salt-block are all cleaned of their bitterings. If the lye should become too weak by being too much used, strengthen it by dissolving more alkali therein.

What I claim as my invention, and desire to secure by Letters Patent, is—

The cleaning of kettles or boilers of any description used in the manufacture of salt, or salt therein, of these bitterings by using the properties of ashes—such as lye, kelp, or potash—as herein described, or any other alkali which shall have the intended effect.

Dated Salina, July 31, 1837.

DAVID DEAR.

Witnesses:
SIMEON SPAULDING,
REUBEN DEAR.